(12) United States Patent
Hagmann et al.

(10) Patent No.: US 7,983,940 B2
(45) Date of Patent: Jul. 19, 2011

(54) PERSPECTIVE REPRESENTATIONS OF PROCESSES

(75) Inventors: Thomas Hagmann, Wiesloch (DE); Robert Lang, Wiesloch (DE); Christian Behre, Heidelberg (DE); Martine Clemot, Stutensee (DE)

(73) Assignee: SAP Aktiengesellschaft, Walldorf (DE)

( * ) Notice: Subject to any disclaimer, the term of this patent is extended or adjusted under 35 U.S.C. 154(b) by 1769 days.

(21) Appl. No.: 10/159,591

(22) Filed: May 31, 2002

(65) Prior Publication Data

US 2003/0225602 A1 Dec. 4, 2003

(51) Int. Cl.
*G06Q 10/00* (2006.01)
(52) U.S. Cl. ............... 705/7.12; 705/7.13; 705/7.17
(58) Field of Classification Search ............ 705/1.1, 705/7.12, 7.13, 7.17
See application file for complete search history.

(56) References Cited

U.S. PATENT DOCUMENTS

| | | | | |
|---|---|---|---|---|
| 5,537,524 A * | 7/1996 | Aprile | ............... | 345/440 |
| 5,661,918 A * | 9/1997 | Malcolm et al. | ............... | 40/107 |
| 5,890,131 A | 3/1999 | Ebert et al. | | |
| 5,907,490 A * | 5/1999 | Oliver | ............... | 700/90 |
| 6,023,702 A * | 2/2000 | Leisten et al. | ............... | 707/100 |
| 6,097,390 A * | 8/2000 | Marks | ............... | 715/772 |
| 6,282,514 B1 * | 8/2001 | Kumashiro | ............... | 705/7 |
| 6,397,202 B1 * | 5/2002 | Higgins et al. | ............... | 706/47 |
| 6,854,088 B2 * | 2/2005 | Massengale et al. | ............... | 715/764 |
| 2001/0032155 A1 * | 10/2001 | Groat et al. | ............... | 705/35 |
| 2003/0135481 A1 * | 7/2003 | Helmes et al. | ............... | 707/1 |
| 2003/0137541 A1 | 7/2003 | Massengale et al. | | |
| 2005/0197999 A1 * | 9/2005 | Kumar | ............... | 707/1 |

FOREIGN PATENT DOCUMENTS

| | | |
|---|---|---|
| JP | 4 141767 | 5/1992 |
| WO | WO 95/24114 | 9/1995 |
| WO | WO 95/30203 | 11/1995 |
| WO | WO 01/59582 | * 8/2001 |

OTHER PUBLICATIONS

"Interactive graphical user interface for PERT/CPM project tracking," IBM Technical Disclosure Bulletin, IBM Corp. New York, US, vol. 33, No. 11, pp. 274-275, Apr. 1991.
Kilponen et al., "ViCA—a WWW based tool for visualizing project status," Proceedings of the 33$^{rd}$ Hawaii International Conference on System Sciences, pp. 1-7, Jan. 4, 2000.
"Progress of Literacy in Various Countries," UNESCO, 1953, 48 pages.
Jenkins, "CBM Charting, Progress Monitoring, and Data Based Instructional Decision Making in a RTI Model," *Educational Consultation Services*, 2008, pp. 1-35.

* cited by examiner

*Primary Examiner* — Dean T Nguyen
(74) *Attorney, Agent, or Firm* — Fish & Richardson P.C.

(57) ABSTRACT

A computer-based method for representing a project includes accessing a description of the project and displaying, based on the description, at least a portion of the project in a perspective representation that generally resembles a path. A computer program product includes instructions that cause a processor to convert a description of the project into display instructions for displaying at least a portion of the project in a perspective representation, displaying relative progress of the project relative to an expected progress of the project, and displaying a relative rate of progress of the project relative to an expectation of a rate of progress. The computer program product is tangibly stored on machine readable media. A computer-based method for representing a project includes receiving a project identification identifying the project, accessing the description of the project identified by the project identification, identifying an element of the project from the description of the project, and displaying the element of the project in a perspective representation of the project.

33 Claims, 6 Drawing Sheets

PERSPECTIVE REPRESENTATIONS OF PROCESSES

BACKGROUND

This invention relates to project and process development.

Project development systems allow a user to, e.g., develop and manage a project. These systems support various types of projects including marketing projects, design projects, manufacturing projects, consulting projects, development projects, and any combination thereof. Project development systems usually can include project development applications that run on computing devices for managing one or more projects.

Project development systems often use a project structure to describe a given project. In general, a project structure maps real-world aspects of a project, such as deadlines and tasks, into an electronically accessible format. For example, many project development systems describe a start, finish, and other schedule dates of a project, the tasks that are performed and the results that are achieved during the project, and the data objects that are generated by the project or used to complete the project.

SUMMARY

The present invention provides methods and apparatus, including computer program products, for dynamically and graphically representing a process.

In general, in one aspect, a computer-based method for representing a project includes accessing a description of the project and displaying, based on the description, at least a portion of the project in a perspective representation that generally resembles a path.

Implementations of this or any other aspect can include one or more of the following features. The perspective representation can be dynamically updated in response to a change in the description of the project. The change can be progress in the project. An indication of an approach to an end of the project can be displayed in the perspective representation by, e.g., displaying a sign alongside the path to indicate the approach to the end of the project. The time remaining in the project can be displayed on the sign. The current position in the project can be displayed along the perspective representation of the project.

Representing the project can also include displaying an element of the project on the path. The element can be a task in the project, and the element can be marked to indicate a characteristic of the element such as, e.g., who is responsible for the element or the degree of completion of the element. A second element of the project can be displayed on the path and a linkage between the first element and the second element can be displayed. The linkage can indicate a dependency between the first element and the second element, such as a flow of information or a flow of material from the first element to the second element. A date indicator indicating a particular date in the project can also be displayed. The date indicator can be a decision indicator that indicates a decision date on which a decision is made.

In general, in another aspect, a computer program product includes instructions that cause a processor to convert a description of the project into display instructions for displaying at least a portion of the project in a perspective representation, displaying relative progress of the project relative to an expected progress of the project, and displaying a relative rate of progress of the project relative to an expectation of a rate of progress. The computer program product can be tangibly stored on machine readable media.

Implementations of this or any other aspect can include one or more of the following features. The instructions can also cause the processor to convert the description of the project into display instructions for dynamically updating at least one of the displayed project, relative progress of the project, and relative rate of progress of the project as the description of the project changes. The relative progress of the project can be displayed relative to, but independently of, an expectation of progress. The relative rate of progress of the project can be displayed relative to, but independently of, an expectation of a rate of progress. The relative progress and the relative rate of progress can be displayed using an indicium. The indicium can be framed in a gauge to assist a user in determining one of the relative progress and the relative rate of progress. The indicium can be, e.g., an arrow indicium that generally resembles an arrow and the gauge can be a speedometer gauge that generally resembles a speedometer.

The instructions can also cause the processor to convert the description of the project into display instructions for displaying the project in a perspective representation of a path. The perspective representation can include one or more of an indication of an approach to an end of the project, a sign alongside the path, and text in the sign indicating the approach to the end of the project. An element of the project can also be displayed on the path. The element can be marked to indicate a characteristic of the element.

In general, in another aspect, a computer-based method for representing a project includes receiving a project identification identifying the project, accessing the description of the project identified by the project identification, identifying an element of the project from the description of the project, and generating display instructions for displaying the element of the project in a perspective representation of at least a portion of the project.

Implementations of this or any other aspect can include one or more of the following features. Representing a project can include receiving a user identification identifying a user and marking the element of the project in accordance with an involvement of the identified user with the element. The involvement can be, e.g., management of the element by the identified user. The element can also be marked in accordance with a degree of completion of the element. Displaying the element can include displaying the element on a path perspective representation that generally resembles a path.

Representing a project can include identifying a second element of the project from the description of the project and displaying a linkage between the first element and the second element. The linkage can indicate a flow of information from the first element to the second element with the linkage. Relative progress and a relative rate of progress can be determined and displayed for either or both of the project and an element in the project. The display can be dynamically updated as the description of the project changes. For example, a marking of the element can be dynamically updated as the description of the element changes.

Implementations of the invention can provide one or more of the following advantages. When a project development system dynamically and graphically represents a project, a manager or other user is able to oversee the project more effectively. In particular, many projects can be complex. For example, projects can involve several different participants working in several different departments using several different technologies. A project manager may lack the expertise, the information, or the time needed to sort through progress reports, documentation, and milestone realization information from the different aspects of the project. A dynamic and graphical representation of the project highlights changes in the project, such as the completion of tasks and milestones, to a manager.

By displaying the relative progress and the relative rate of progress independently of an expectation metric, the space on a display vacated by an expectation metric can be devoted to other purposes and more compressed displays result. Moreover, since human users are adept at processing visual information presented in perspective, perspective representations of the project can readily convey project information to a human user.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
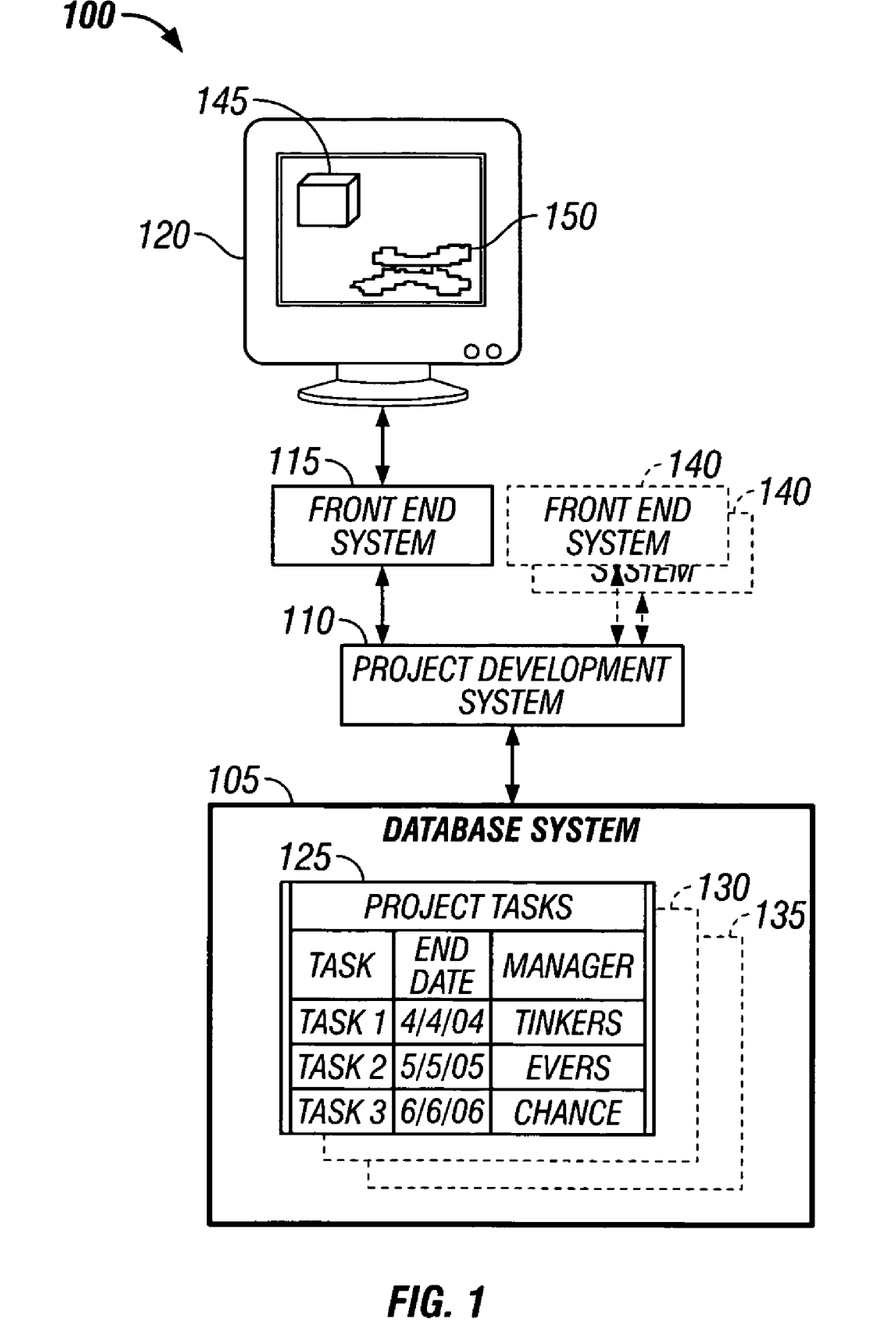
FIG. 1 shows a system for graphically and dynamically representing projects

As shown in FIG. 1, a system 100 in accordance with the invention for representing projects includes a database system 105, a project development system 110, a front end system 115, and a graphical output device such as a monitor 120. Database system 105 stores a collection of objects 125, 130, 135 or other data that describe a project. Project development system 110 is an application that stores and executes a project development application. Project development system 110 accesses objects 125, 130, 135 while executing the project development application to develop and manage the project. Front end system 115 communicates with project development system 110 during execution of the project development application. For example, front end system 115 can receive information and instructions for dynamically and graphically representing the project on monitor 120.

System 100 can be part of project development system 110 and can also include one or more additional front end systems 140 that communicate with project development system 110 during execution of the project development application. For example, front end systems 140 can provide information to project development system 110 that updates the status of the project as, e.g., tasks are completed and milestones reached. Project development system 110 incorporates this information into objects 125, 130, 135. The description of the project at database system 110 thus dynamically changes in time, and the changes are dynamically and graphically displayed for a user by front end system 115 on monitor 120.

In particular, the representation of the project on monitor 120 can include a graphical representation of the structure of the project 145 and a graphical representation of the status and progress of the project 150. The structure of the project 145 and the status and progress of the project 150 can be represented, e.g., in one or more iconic devices that may not include text information. The one or more iconic devices can change dynamically, for example, in real time, to represent the changes in the description of the project stored at database system 105. By dynamically and graphically representing the project, system 100 highlights the changes in the project description to a user such as a project manager.

Figure 2:
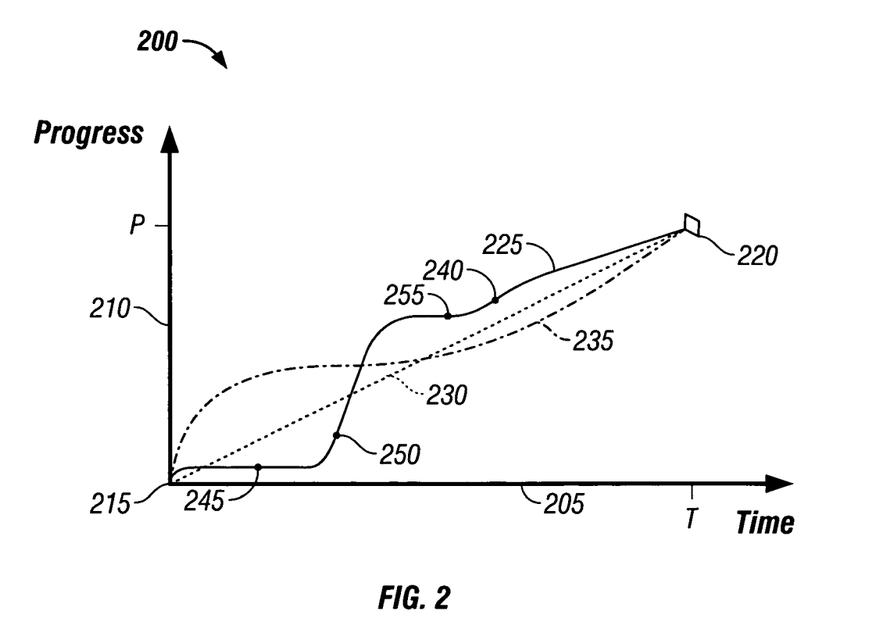
FIG. 2 shows a representation of a project.

For example, as shown in FIG. 2, a project can be represented using a Cartesian representation 200. Representation 200 includes an x-axis 205 and a y-axis 210 that cross at an origin 215. X-axis 205 represents time in the project and y-axis 210 represents progress of the project. The project can start at origin 215 and be projected to end at an end point 220. End point 220 is a time T after the start time at origin 215 and has advanced a progress P after the starting circumstance at origin 215.

The course of the project can be indicated along a path 225 within representation 200. Path 225 extends from the project start at origin 215 to project end point 220 and maps the real world project into representation 200. In particular, for each point in time (i.e., for each point along the x-axis), path 225 maps the absolute progress of the project and the rate of progress in the project. The absolute progress of the project is provided by the vertical position of path 225 for each point in time. The rate of progress is provided by the slope of path 225 for each point in time. Path 225 can dynamically change as the project progresses.

Representation 200 can also include metric paths 230, 235. Metric paths 230, 235 are standard expectations used to estimate the course of the project along path 225. For example, metric path 230 represents the course of a project that is expected to progress linearly from starting at origin 215 to end point 220. Metric path 235 represents the course of a project that is expected to progress at different rates between origin 215 and end point 220. The course of metric path 235 can be determined from, e.g., estimates or historical records of the time needed to complete different portions of the course of the project.

The relative progress of a project can be determined by comparing the position of path 225 to a selected metric path 230, 235. In one example, when path 225 is above the selected metric path 230, 235 at a point in time (such as, e.g., a point 240), the project has progressed farther than expected. In another example, when path 225 is below the selected metric path 230, 235 at a point in time (such as, e.g. a point 245), the project has not progressed as far as expected.

The relative rate of progress of a project can be determined by comparing the slope of path 225 to the slope of the selected metric path 230, 235. When the slope of path 225 is greater than the slope of the selected metric path 230, 235 at a point in time (such as, e.g. a point 250), the project is progressing faster than expected. When the slope path 225 is less than the slope of the selected metric path 230, 235 at a point in time (such as, e.g. a point 255), the project is progressing slower than expected.

As shown in FIGS. 3-6, the course of a project including the relative progress of the project and the relative rate of progress of the project can be dynamically represented using an indicium 300. Indicium 300 can be, e.g., an alphanumeric character, a cipher, or another graphic device. In one particular implementation, indicium 300 is an arrow.

Figure 3:
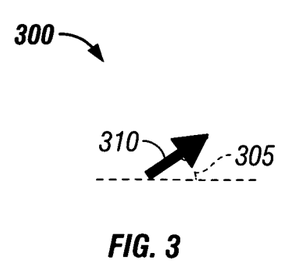
FIGS. 3-5 show indicia for independently representing a project.
Figure 4:
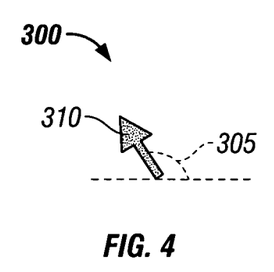
Figure 5:
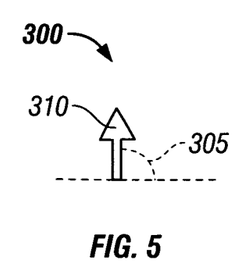

Indicium 300 has both an orientation 305 and a visual characteristic 310. Orientation 305 of indicium 300 independently indicates the relative rate of progress of the project at a particular time. In other words, orientation 305 does not require a scale to indicate the relative rate of progress to a user.

Visual characteristic 310 independently indicates the relative progress of the project at a particular time. In other words, visual characteristic 310 does not require a scale to indicate relative progress. Visual characteristic 310 can be, e.g., a color of indicium 300, a pixel density of indicium 300, or any other visually identifiable characteristic of indicium 300 that can indicate a scale. In one particular implementation, visual characteristic 310 is green to indicate that the project has progressed relatively farther than expected, visual characteristic 310 is yellow to indicate that the project has progressed in accordance with expectations, and visual characteristic 310 is red to indicate that the project has not progressed relatively as far as expected at a particular time.

By displaying the relative progress and the relative rate of progress independently of an expectation metric, the space on a display vacated by the expectation metric can be devoted to other purposes and more compressed displays result. Moreover, both orientation 305 and visual characteristic 310 of indicium 300 can dynamically represent changes in the project. For example, indicium 300 can reorient and change color. By dynamically representing the project, indicium 300 highlights changes in the project to a user such as a project manager.

Figure 6:
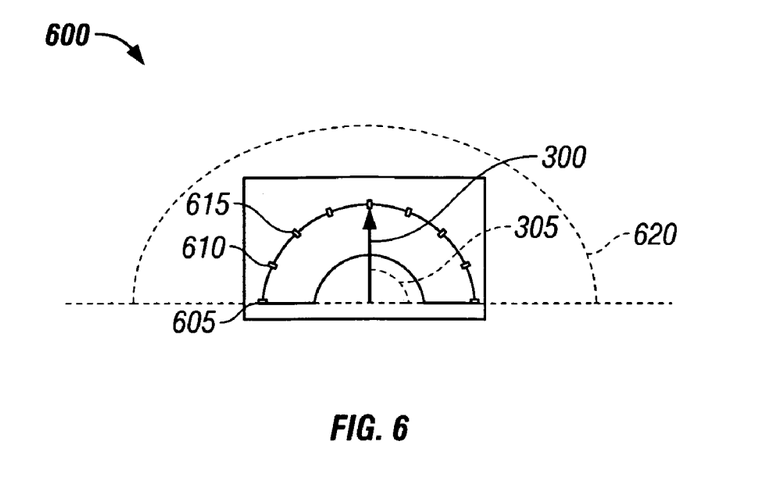
FIG. 6 shows an indicium framed in a gauge.

As shown in FIG. 6, indicium 300 can be framed in a gauge 600 that helps a user to determine orientation 305 of indicium 300. Gauge 400 includes marks 605, 610, 615 that subdivide a range 620 of potential orientations of indicium 300 so that a user might easily determine orientation 305. Gauge 600 can generally resemble a speedometer.

Figure 7:
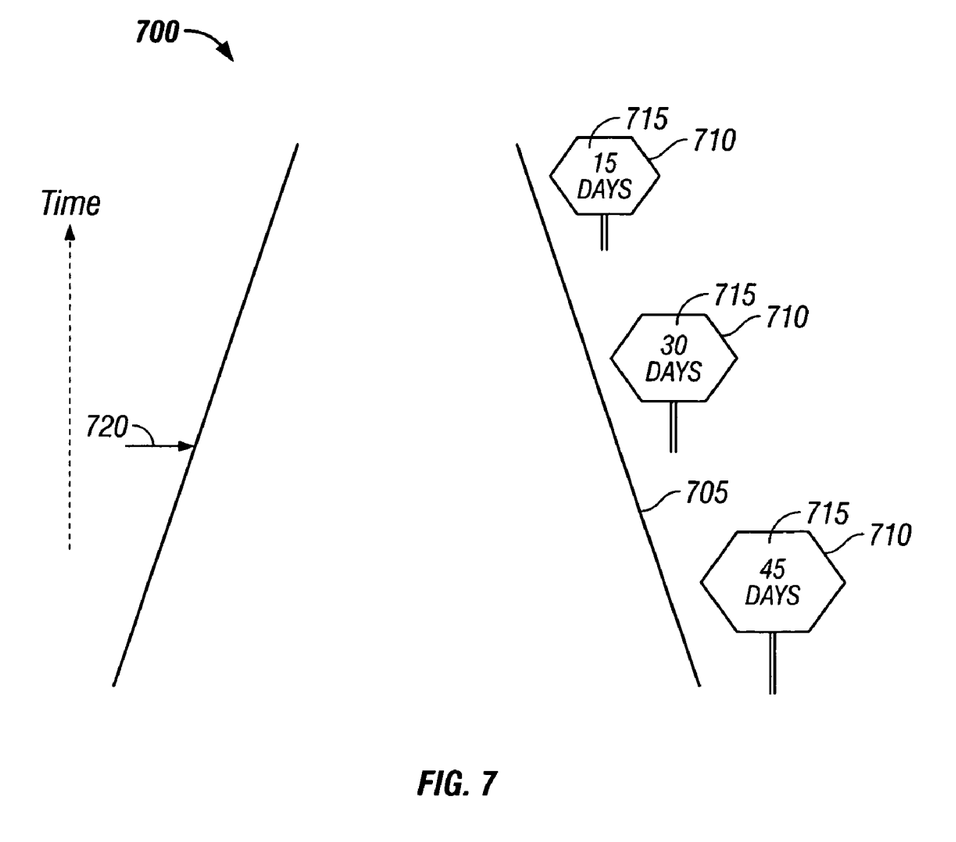
FIGS. 7-9 show perspective representations of a project.

As shown in FIG. 7, the course of a project can also be dynamically represented using a perspective representation 700. In one example, perspective representation 700 includes a path representation 705 that extends into the horizon of a display and is bounded by a collection of end markers 710. Using alphanumeric characters 715, end markers 710 mark the approach of path representation 705 to the end of the project. End markers 710 can mark, e.g., the remaining time allotted to the project. The current time along path representation 705 can be indicated by a present day indicator 720. Present day indicator 720 can generally resemble, for example, an arrow.

Since human users are adept at processing visual information presented in perspective, perspective representation 700 can readily convey information about the end of a project to a user.

Figure 8:
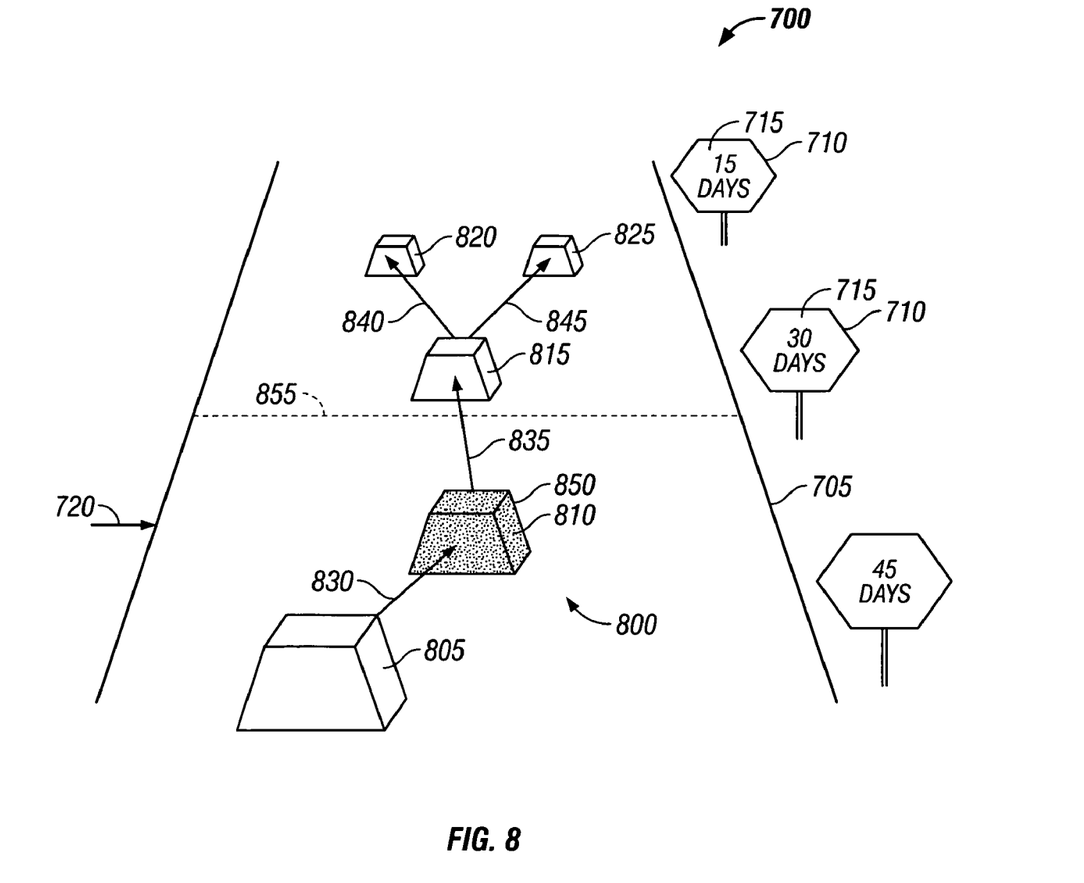

As shown in FIG. 8, perspective representation 700 can include an element series 800 that can also be represented in perspective. Element series 800 includes a collection of project elements 805, 810, 815, 820, 825 that are linked by a collection of linkages 830, 835, 840, 845. Project elements 805, 810, 815, 820, 825 represent subunits of the project such as specific tasks or milestones along the path of the project and along path representation 705.

Linkages 830, 835, 840, 845 indicate relationships between project elements 805, 810, 815, 820, 825. For example, linkages can indicate dependencies between project elements 805, 810, 815, 820, 825, such as when one project element must be completed before work on another project element can begin or when information or material from one project element flows to the next project element. Linkages 830, 835, 840, 845 can, e.g., generally resemble arrows to indicate dependencies.

Project elements 805, 810, 815, 820, 825 can be marked to indicate a characteristic of the project element. As shown, project element 810 is marked by pixelation 850 to indicate, along with present day indicator 720, that project element 810 is the current project element. Other markers can indicate, e.g., the criticality of a project element, the percent completion of the project element, who is responsible for a project element, or who is interested in a project element. Markers such as pixelation 850 can also dynamically represent changes in the individual elements of the project. For example, pixelation 850 can become progressively denser as project element 810 approaches completion. By dynamically changing, markers such as pixelation 850 highlight the changes in the individual elements of the project to a user.

Perspective representation 700 can also include a significant date indicator 855. Date indicator 855 can indicate, e.g., the date on which a decision will be made, such as whether or not to proceed to the end of the project. If a user selects date indicator 855 by, e.g., clicking on date indicator 855 using a mouse, then a window describing the significance of the date (such as, e.g., who is the decision maker, the exact date, and decision criteria) pops up. Date indicator 855 can, e.g., generally resemble a broken line boundary across path representation 705.

Figure 9:
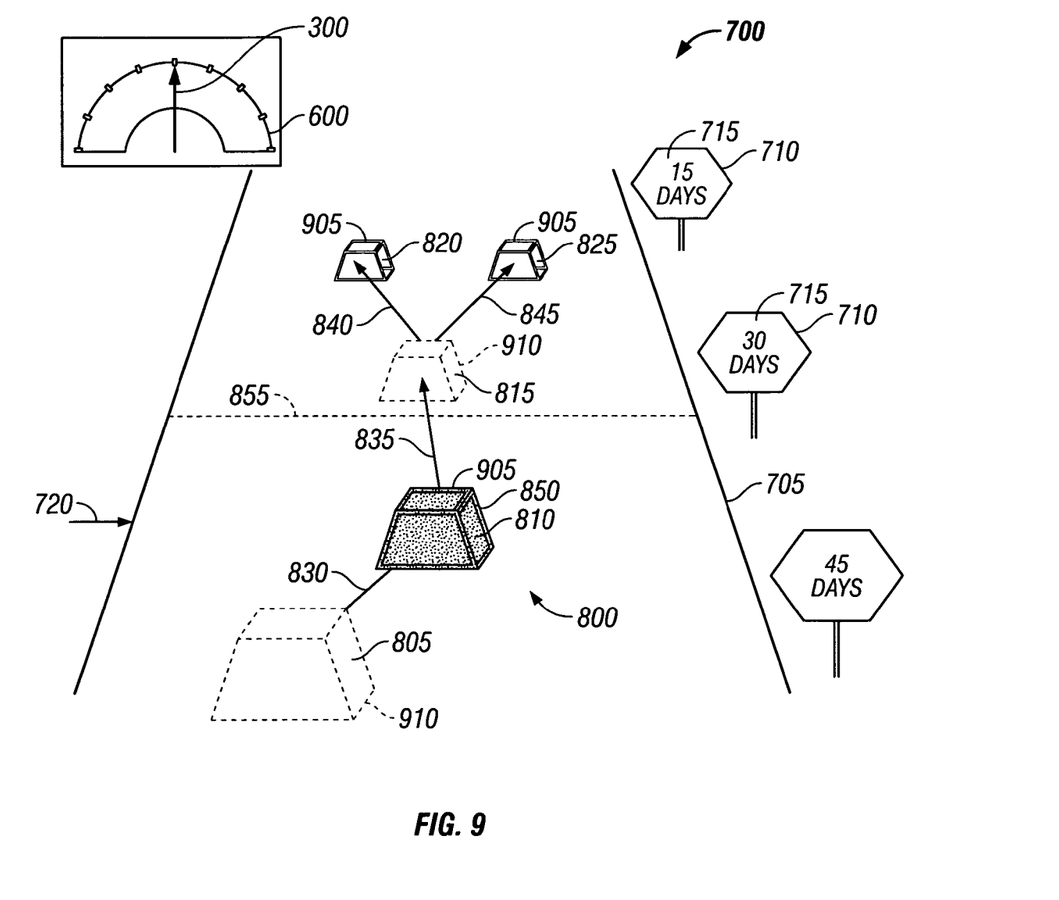

As shown in FIG. 9, perspective representation 700 can also include gauge 600 framing indicium 300. Gauge 600 and indicium 300 can be positioned adjacent path representation 705. If a user selects a particular project element 805, 810, 815, 820, or 825, a second gauge 600 and indicium 300 that describe progress within the selected project element can pop up adjacent to, within, or at a specified location relative to the indicated element.

Also as shown in FIG. 9, perspective representation 700 can also include provide a role-based view of the course of a project. In particular, the project elements to which a user contributes, such as, e.g., project elements 810, 820, and 825, can include a highlight marker 905 to indicate that the user is involved with, interested in, or responsible for these elements. Likewise, project elements to which a user does not contribute, such as, e.g., project elements 805 and 815, can include a dashed line marker 910 to indicate that the user is not involved with these elements. Other markers can indicate, e.g., that the user is responsible for management of the project element, or can identify one or more individuals who contribute to the project element.

Figure 10:
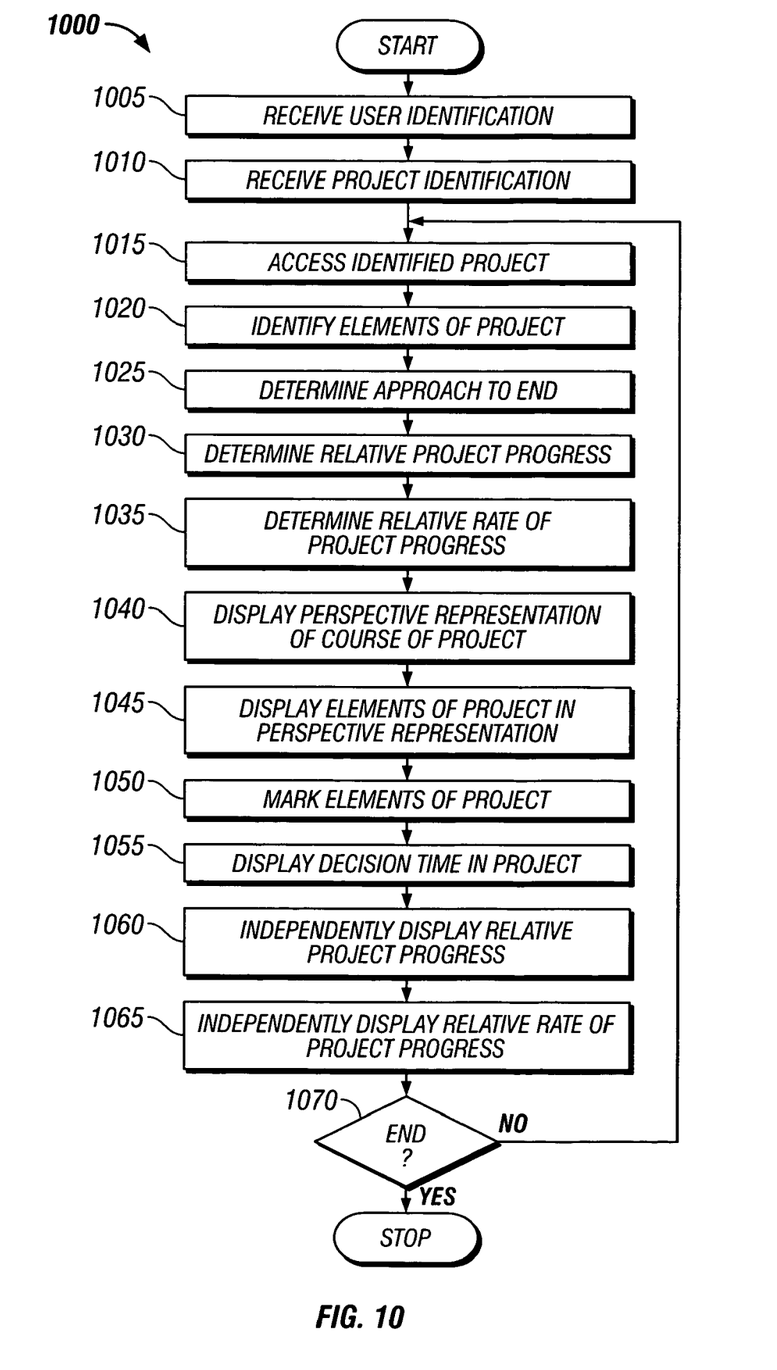
FIG. 10 shows a method for representing a project.

As shown in FIG. 10, a system for graphically and dynamically representing the course of a project can perform a method 1000 to, e.g., create the described representations. The system for representing the course of a project first receives an identification of the user for whom the project is to be represented (step 1005) and an identification of one or more projects in which the user is interested (step 1010). The user identification can be, for example, a login name or a password.

The system then accesses a project structure that relates to the identified project (step 1015). The project structure can include information, in an electronically accessible format, about the a start, finish, decision dates, and other schedule dates of a project, the tasks that are performed and the results and milestones that are to be achieved during the project, and the data objects that are generated by the project or used to complete the project. The system identifies elements of the project from the project structure (step 1020). The elements can be, for example, the component tasks of the project or the milestones that are to be achieved during the course of the project.

The system also determines the approach to the end of the project (step 1025). For example, the system can compare the current date with the finish date of the project from the accessed project structure to determine the time remaining in the project. The system can also determine the portion of the project elements have been completed to identify appropriate scaling for a representation of the course of the project.

The system also determines the relative progress of the project and/or individual element within the project (step 1030) by comparing the progress of the project with the expected progress. For example, the project elements that have been completed can be compared with a metric that describes an expected element completion.

The system also determines the relative rate of progress of the project and/or individual element within the project (step 1035) by comparing the rate of progress of the project with the expected rate of progress. For example, the rate of completion of project elements can be compared with the expected rate of completion of project elements in a project metric. The rates can be smoothed by, e.g., averaging the rates over a suitable period of time to minimize the effects of element discretization.

The system can display the course of the project using a perspective representation of the course of the project (step 1040). The perspective representation of the course of the project can generally resemble perspective representation 700 and can include one or more graphical devices that indicate the approach to the end of the project and the current position along the course of the project. The approach to the end and the current position can be given in time.

The system can also display some or all of the identified elements of the project in the perspective representation of the course of the project (step 1045). The identified element display can generally resemble element series 800, and can include linkages between the elements to indicate dependency. The system can then mark some or all of the elements in the perspective representation (step 1050). Elements can be marked to indicate the elements associated with or managed by the user who is identified by the received user identification. Elements can also be marked to indicate whether an element is the current element, the state of completion of the element, the criticality of the element, or that the user is not associated with an element.

The system can also display a date indicator along the course of the project (step 1055). When the system receives a user selection identifying the displayed date indicator, the system can provide additional information about the date such as, e.g., the person responsible for making a decision on that date, the date of the decision, and the criteria upon which the decision will be based.

The system can also display the relative progress of a project independently of the metric used to determine the relative progress (step 1060), and the relative rate of progress of a project independently of the metric used to determine the relative rate of progress (step 1065). Both the relative progress and the relative rate of progress can be displayed in a single indicium, such as indicium 300. The indicium can be framed in a gauge in the display to aid a user in determining the relative orientation of the indicium.

The system also determines if it has received an indication that dynamic representation of the project is no longer desired (decision 1070). The indication can be received, e.g., from a project manager or other user. If the representation is to continue, the system again accesses the project structure to update the displays created in steps 1040 through 1065 with any changes.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs ("application-specific integrated circuits").

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of the invention have been described. Nevertheless, it will be understood that various modifications may be made without departing from the spirit and scope of the invention. For example, the methods and apparatus described herein can be used for dynamically and graphically representing projects.

Accordingly, other implementations are within the scope of the following claims.

What is claimed is:

1. A computer-based method for representing a project, comprising:
    accessing a description of the project;
    displaying, based on the description, a first element and a second element of the project in a perspective representation that generally resembles a path, the perspective representation being displayed on a display device;
    receiving a user identification identifying a user for whom the perspective representation is to be displayed on the display device;
    based on the received user identification, marking the first element in the display of the perspective representation on the display device, the marking of the first element indicating an involvement of the identified user with the first element, and marking the second element in the display of the perspective representation on the display device, the marking of the second element indicating that the identified user is not involved with the second element; and
    graphically indicating progress in the project in the display of the perspective representation on the display device.

2. The method of claim 1, further comprising dynamically updating the display of the perspective representation on the display device in response to a change in the description of the project.

3. The method of claim 2, wherein the change in the description of the project comprises a change in the progress in the project.

4. The method of claim 1, further comprising displaying an indication of an approach to an end of the project in the display of the perspective representation on the display device.

5. The method of claim 4, wherein the indication of the approach to the end of the project comprises a sign alongside the path to indicate the approach to the end of the project.

6. The method of claim 5, further comprising displaying a time remaining in the project on the sign.

7. The method of claim 1, further comprising displaying a current position in the project along the perspective representation of the project.

8. The method of claim 1, wherein the first element comprises a first task in the project.

9. The method of claim 1, further comprising marking the first element to indicate a characteristic of the first element.

10. The method of claim 9, wherein the characteristic of the first element identifies who is responsible for the first element.

11. The method of claim 9, wherein the characteristic of the first element comprises a degree of completion of the first element.

12. The method of claim 1, further comprising:
displaying a third element of the project on the path; and
displaying a linkage between the first element and the first element.

13. The method of claim 12, wherein the linkage indicates a dependency between the first element and the third element.

14. The method of claim 13, wherein the dependency comprises a flow of information from the first element to the third element.

15. The method of claim 13, wherein the dependency comprises a flow of material from the first element to the third element.

16. The method of claim 1, further comprising displaying a date indicator indicating a particular date in the project.

17. The method of claim 16, wherein the date indicator indicates a decision date on which a decision is made.

18. The method of claim 1, wherein marking the first element comprises marking the first element so as to indicate that the task is managed by the identified user.

19. The method of claim 1, wherein marking the second element so as to indicate that the identified user is not involved with the second element comprises representing the second element on the display device using a dashed line.

20. The method of claim 1, wherein displaying the first element and the second element in the perspective representation, marking the first element, marking the second element, and graphically indicating progress in the project all comprise physically transforming display elements of the display device.

21. A computer-based method for representing a project, comprising:
receiving a project identification identifying the project;
accessing a description of the project identified by the project identification;
identifying a first task and a second task in the project from the description of the project;
representing the first task in the project as a first element and the second task as a second element in a perspective representation of at least a portion of the project, the perspective representation being displayed on a display device;
receiving a user identification identifying a user for whom the perspective representation is to be displayed on the display device; and
based on the received user identification, displaying the first element in the perspective representation on the display device, the displaying of the first element indicating an involvement of the identified user in performance of the first task, and displaying the second element in the perspective representation on the display device, the displaying of the second element indicating that the identified user is not involved with the second task.

22. The method of claim 21, wherein the involvement of the identified user in performance of the first task comprises a management of the performance of the first task by the identified user.

23. The method of claim 21, further comprising marking the first element of the project in accordance with a degree of completion of the first task.

24. The method of claim 21, wherein the perspective representation on the display device comprises a path perspective representation that generally resembles a path.

25. The method of claim 21, further comprising:
identifying a third task in the project from the description of the project;
representing the third task as a third element in the perspective representation on the display device; and
displaying a linkage between the first element and the third element.

26. The method of claim 25, wherein the linkage comprises an indicator of a flow of information from the first task to the third task with the linkage.

27. The method of claim 21, further comprising:
determining relative progress in the project and a relative rate of progress in the project; and
displaying the relative progress and the relative rate of progress on the display device.

28. The method of claim 21, further comprising:
determining relative progress for the first element and a relative rate of progress for the first element; and
displaying the relative progress for the first element and the relative rate of progress for the first element on the display device.

29. The method of claim 21, further comprising dynamically updating the display on the display device as the description of the project changes.

30. The method of claim 29, wherein dynamically updating the display comprises dynamically updating a marking of the first element as the description of the first task changes.

31. The method of claim 21, wherein displaying the first element comprises marking the first element to indicate that the first task is managed by the identified user.

32. The method of claim 21, wherein displaying the second element so as to indicate that the identified user is not involved with the second element comprises representing the second element on the display device using a dashed line.

33. The method of claim 21, wherein representing the first task and the second task in the perspective representation and displaying the first element and the second elements in the perspective representation all comprise physically transforming display elements of the display device.

* * * * *